(12) United States Patent
Li

(10) Patent No.: US 11,383,486 B2
(45) Date of Patent: Jul. 12, 2022

(54) WAVY NETWORK STRUCTURES DISPERSED IN A HARD PHASE

(71) Applicant: University of New Hampshire, Durham, NH (US)

(72) Inventor: Yaning Li, Durham, NH (US)

(73) Assignee: UNIVERSITY OF NEW HAMPSHIRE, Durham, NH (US)

( * ) Notice: Subject to any disclaimer, the term of this patent is extended or adjusted under 35 U.S.C. 154(b) by 262 days.

(21) Appl. No.: 16/531,858

(22) Filed: Aug. 5, 2019

(65) Prior Publication Data

US 2020/0047458 A1 Feb. 13, 2020

Related U.S. Application Data

(60) Provisional application No. 62/715,357, filed on Aug. 7, 2018.

(51) Int. Cl.
*B32B 7/022* (2019.01)
*B32B 27/08* (2006.01)
*B33Y 80/00* (2015.01)

(52) U.S. Cl.
CPC .............. *B32B 7/022* (2019.01); *B32B 27/08* (2013.01); *B33Y 80/00* (2014.12); *B32B 2307/54* (2013.01)

(58) Field of Classification Search
CPC ..... B32B 7/022; B32B 27/08; B32B 2307/54; B33Y 80/00
See application file for complete search history.

(56) References Cited

U.S. PATENT DOCUMENTS

| 8,652,602 | B1* | 2/2014 | Dolla | B29C 44/357 442/205 |
| 10,830,102 | B2* | 11/2020 | Martin | B32B 3/12 |
| 2005/0142331 | A1* | 6/2005 | Anderson | B32B 5/26 428/196 |
| 2007/0162112 | A1* | 7/2007 | Burriesci | A61F 2/2448 623/901 |
| 2008/0011021 | A1* | 1/2008 | Starbuck | A43B 23/0205 66/170 |
| 2010/0029796 | A1* | 2/2010 | Alderson | B29C 44/5636 521/142 |
| 2011/0029063 | A1* | 2/2011 | Ma | A61F 2/915 623/1.16 |
| 2011/0046715 | A1* | 2/2011 | Ugbolue | D04B 21/12 602/53 |
| 2011/0282452 | A1* | 11/2011 | Koerner | G10K 11/162 428/105 |

(Continued)

FOREIGN PATENT DOCUMENTS

| CN | 108481821 B | 6/2019 |
| JP | 2010004965 A1 | 1/2010 |

OTHER PUBLICATIONS

Omnexus (Polymer Properties; Young's Modulus: Tensile Elasticity Units, Factors & Material Table (specialchem.com)).*

*Primary Examiner* — Travis M Figg
(74) *Attorney, Agent, or Firm* — Grossman, Tucker, Perreault & Pfleger, PLLC

(57) ABSTRACT

The present invention is directed at materials and methods for their formation having wavy network structures dispersed in a second and relatively harder phase. The materials can be designed to exhibit auxetic properties (e.g. a negative Poisson's ratio) in response to an application of force.

5 Claims, 10 Drawing Sheets

(56) References Cited

U.S. PATENT DOCUMENTS

| | | | |
|---|---|---|---|
| 2012/0129416 A1* | 5/2012 | Anand | A43B 23/0205 |
| | | | 442/306 |
| 2012/0147351 A1* | 6/2012 | Jak | G03F 7/70191 |
| | | | 355/71 |
| 2013/0344601 A1* | 12/2013 | Soman | A61L 27/14 |
| | | | 264/401 |
| 2014/0058517 A1* | 2/2014 | Sabatino | A61F 2/4425 |
| | | | 623/17.16 |
| 2014/0205795 A1* | 7/2014 | Hu | B32B 5/028 |
| | | | 28/165 |
| 2016/0353825 A1* | 12/2016 | Bottlang | B32B 3/12 |
| 2017/0009036 A1* | 1/2017 | Xie | C08J 9/00 |
| 2018/0194106 A1* | 7/2018 | Tibbits | B32B 3/266 |

\* cited by examiner

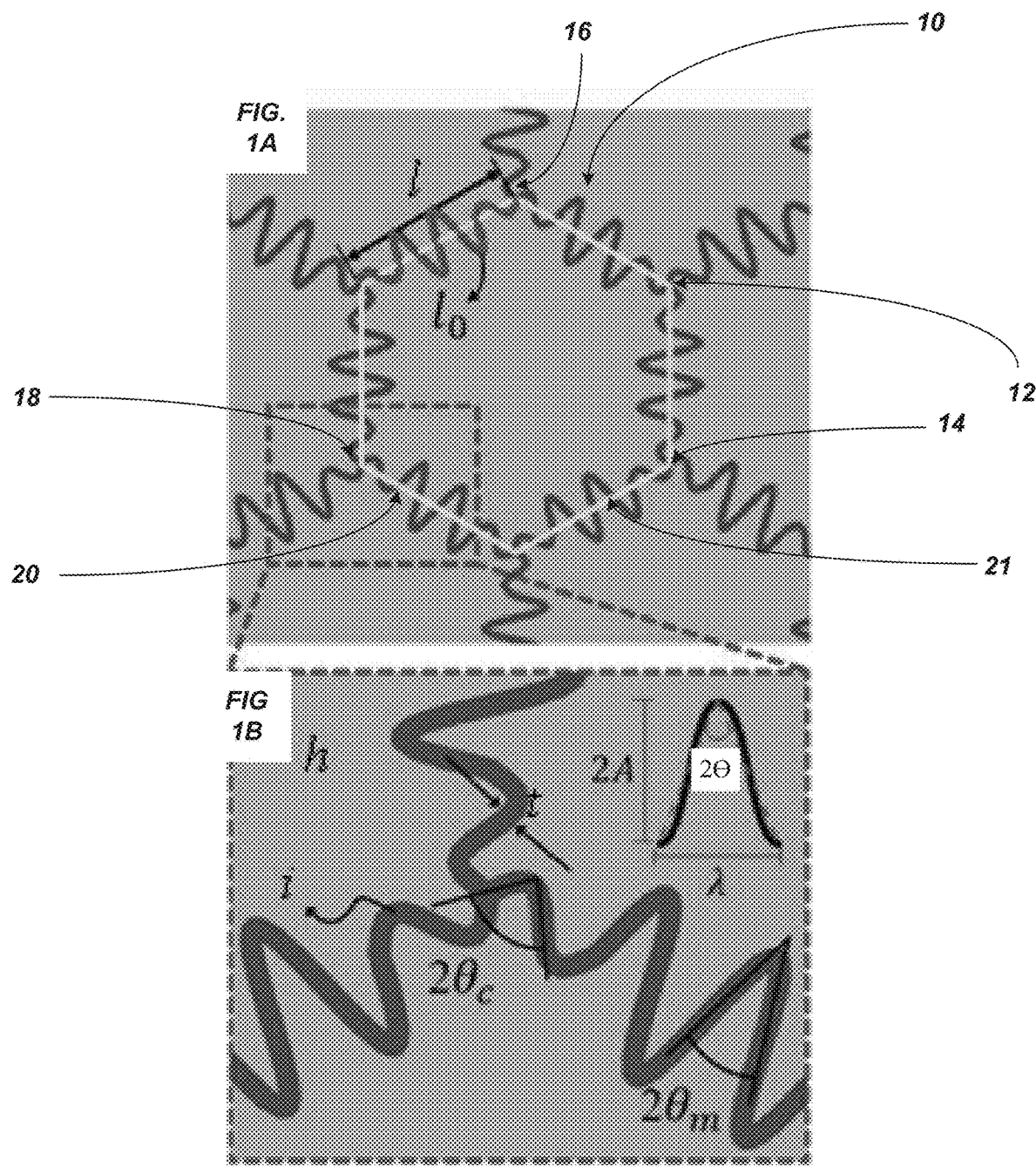

WAVY NETWORK STRUCTURES DISPERSED IN A HARD PHASE

CROSS-REFERENCE

The present application claims the benefit of the filing date of U.S. Provisional Application Ser. No. 62/715,357 filed Aug. 7, 2018, the teachings of which are incorporated herein by reference.

FIELD

The present invention is directed at materials having wavy network structures dispersed in a second and relatively harder phase. The materials can exhibit auxetic properties (e.g. a negative Poisson's ratio) in response to an application of force.

BACKGROUND

A material under tension or compression undergoes a change in length, width, and height. For example, for a tensile load, the ratio of the relative contraction strain (normal to the applied tensile force) to the relative extension strain (parallel to the applied force) is generally known as the Poisson's ratio. When a tensile force is applied to a material having a positive Poisson's ratio, the length and width of the material tends to decrease as the height of the material increases. Conversely, when a compressive force is applied to a material having a positive Poisson's ratio, the length and width of the material tends to increase as the height of the material decreases.

However, not all materials have a positive Poisson's ratio. Materials having a negative Poisson's ratio are commonly referred to as auxetic materials. For example, when a tensile force is applied to an auxetic material, as the height increases, at least one of the length and/or the width of the material tends to increase. Conversely, when a compressive force is applied to an auxetic material, as the height decreases at least one of the length and/or the width of the material tends to decrease.

SUMMARY

A network structure comprising three wavy segments that extend in three directions from a first connection location wherein said wavy segments have a Young's modulus value Ei and said wavy segments are dispersed in a second phase of material having a Young's modulus $E_h$ where Eh>Ei. The wavy segments are positioned between the first and a second connection location and at about a midpoint between the first and second connection locations the wavy segments change direction and define an angle $2\theta_m$ wherein the value of $\theta_m$ is greater than zero and less than 90°. Such structures may have either a positive or negative Poisson's ratio.

In related embodiment, the present invention relates to three wavy segments that extend in three directions from a first connection location wherein the wavy segments have a Young's modulus value Ei and the wavy segments are dispersed in a second phase of material having a Young's modulus $E_h$ where Eh>Ei. The wavy segments are positioned between the first and a second connection location and at about a midpoint between the connection locations the wavy structure changes direction and defines an angle $2\theta_m$ wherein the value of $\theta_m$ is greater than or equal to 5° and the value of $E_h$/Ei is greater than or equal to $1\times10^3$.

In method form, the present invention relates to a method for forming a network structure comprising forming three wavy segments that extend in three directions from a first connection location wherein said wavy segments have a Young's modulus value Ei and said wavy segments are dispersed in a second phase of material having a Young's modulus $E_h$ where Eh>Ei; and said wavy segments are positioned between said first and a second connection location and at about a midpoint between said first and second connection locations said wavy segments change direction and define an angle $2\theta_m$ wherein the value of $\theta_m$ is greater than zero and less than 90°. Such method of forming may be achieved by additive manufacturing.

BRIEF DESCRIPTION OF THE DRAWINGS

FIG. 1A illustrates the wavy network structure herein and the formation of a polygonal hexagonal cell.

FIG. 1B illustrates a blow-up of a portion of FIG. 1A identifying various parameters of the hexagonal wavy structure of FIG. 1A.

DETAILED DESCRIPTION

Figure 2A:
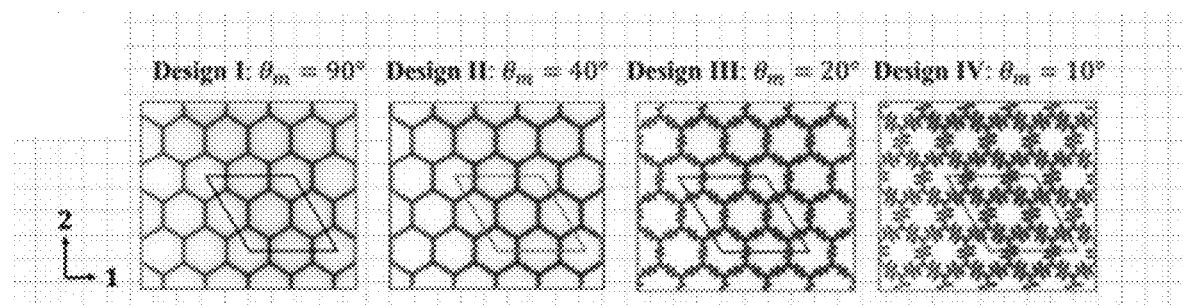
FIG. 2A illustrates experimental and finite element (FE) results of the identified wavy structure specimens (Designs I, II, III and IV) with increasing waviness.

The present invention is directed at a three-fold architecture. Reference to a three-fold architecture may be understood as a structure comprising three wavy segments that extend in three directions which wavy segments are dispersed in another (second) phase of material. More specifically, the wavy segments may comprise any wave form where the segments change direction one or a plurality of times between connecting locations. Such three-fold architecture dispersed in a second phase of material may be preferably formed via additive manufacturing, which is reference to the process of forming materials from three-dimensional model data, via layer-by layer build up, to a desired final network structure.

With reference to FIG. 1A, the wavy segments 10 which can also be understood as providing a wavy structure defining a wavy interfacial layer can be seen along with connection location 12. As can be seen, three (3) wavy segments 10 therefore connect to and extend from connection location 12 and engage with other connection locations shown at 14 and 16. Thus, it can be understood that there may be a plurality of connection locations present. For example, another connection location 18 is shown that again serves as a connection location for three other wavy segments 10. As also shown in FIG. 1A, the straight-line distance between connection points may be defined as distance "l". The actual length of the wavy segment 10 is represented by the distance "$l_0$". Preferably, the value of "l" herein may range from 100 nm to 1.0 meter.

With attention to FIG. 1B, the wavy segments 10 preferably comprise a relatively soft phase or interfacial layer "i" and are dispersed as wavy interfacial layers in a second phase of material identified at "h". As noted further herein, preferably, such second phase of material is a relatively stronger material than the material used for formation of the wavy segments 10 and such second phase material "h" comprises the major volume (i.e more than 50% of the volume of material present). More preferably, the volume fraction of the second phase material present is greater than or equal to 60%, or greater than or equal to 70%, or greater than or equal to 80%, or greater than or equal to 90%. Furthermore, the Young's modulus value of the second phase material "h", identified as $E_h$ is greater than the Young's modulus value for the wavy structure 10 interfacial layer, identified as $E_i$. That is, $E_h > E_i$.

In addition, as illustrated in FIG. 1B the angle of the wavy segment where the segment changes direction can be identified as "2θ". In addition, the angle of the wavy segment where it changes direction is at about the midpoint between connection locations and may be identified as "$2\theta_m$". The angle of the wavy segment where it changes direction and connects to a connection location may then be identified as "2θ". The wavy segment is also characterized by a wavelength λ and an amplitude of "2A". It should be appreciated that the value of the wavelength λ is such that λ=(0.1–1.0)(l). In addition, the value of the amplitude "2A" is such that 2A is greater than zero up to a value of 1.5(l). Finally, the wavy segment may have a thickness "t" where the value of "t" may preferably fall in the range of 1 nm to 10 cm or even more preferably, 20 nm to 10 cm.

The value of θ is can be mathematically defined as $\theta = \tan^{-1} \lambda/4A$. As alluded to above, 2θ represents the tip angle of the wavy segment where it changes direction and it may preferably be in the form of a sinusoidal wave. Thus, θ can have value of greater than 0° and less than 90°. When θ=90°, the wavy segment 10 becomes flat or straight, and when θ decreases, the wavy segment 10 becomes relatively more wavy. The suture complexity index, SI can therefore be defined as the ratio between the perimeter length of the hexagonal cell (item 20 in FIG. 1A defines the hexagonal cell) and that of a flat hexagonal cell. For the design where wavy segment 10 is flat or straight, SI=1.

As can also be seen in FIG. 1B, preferably, the wavy segments herein connect and can define one or a plurality of hexagonal cells 20. As can be seen, the hexagonal cell 20 that can be drawn and superimposed (overlaid) on the wavy segments is composed of a plurality of straight lines 21 for which the wavy segments 10 crisscrosses. In that regard, the drawn straight lines 21 therefore fall within the wavy segments to define, as noted, the hexagonal cell 20. The wavy segments herein may therefore connect between the connection locations 18 and allow for one to define other polygonal type geometric shapes (i.e. any 2-dimensional shape formed with straight lines) such as a square, a rectangle, triangle, pentagon, heptagon, or octagon. Such geometric shapes that are defined by the wavy segments as noted herein therefore can repeat in the network to provide a repeating pattern array of such geometric shapes, where the wavy segments, as noted, are connected. Such plurality of polygonal geometric shapes that are present in the network structures herein, in the representative case of a hexagonal cell 20, can be seen in FIG. 2A, where the value of $\theta_m$ is greater than zero and less than 90°. Preferably, the value of $\theta_m$ herein may fall in the range of 5° to 75° or 10° to 45°.

However, in the broad context of the present invention, the repeating shapes that may be drawn and superimposed on the wavy segments herein may take on a variety of different shapes other than the polygonal shapes noted above. For example, such shapes may include curved lines and provide a round or an oval shape that repeats within the network.

To therefore explore the influence of wavy segment 10 waviness on the mechanical behavior centimeter-scale specimens with four different amplitudes (which varied as a function of $\theta_m$) were fabricated via multi-material 3D printing (FIG. 2A). The hard segment phase h was fabricated from a thermoplastic with a modulus of about 2 GPa and the co-fabricated wavy segments 10 produced from a material with a modulus of about 4 MPa. Design I: $\theta_m = \theta_c = 90°$, resulted in hexagonal cells with flat (i.e. non-wavy) interfacial layers; Design II: $\theta_m = 40°$; Design III, $\theta_m = 20°$; and Design IV, $\theta_m = 10°$. For Designs II, III, and IV, $\theta_c = 46°$. Thus, from Design I to Design IV, the structures become relatively more wavy. For these representative designs, the wavelength λ of each wave (λ=2.16 mm), the edge length l of the hexagonal cells (l=8.64 mm), and the in-plane thickness t=400 μm and remained the same. Further detailed dimensions of these exemplary designs are listed in Table1.

TABLE 1

| | Preferred Dimensions | | | | | | | | | |
|---|---|---|---|---|---|---|---|---|---|---|
| Design | $\theta_m$ (°) | $\lambda_m$ (mm) | $A_m$ (mm) | $\theta_c$ (°) | $\lambda_c$ (mm) | $A_c$ (mm) | l (mm) | t (μm) | S (mm$^2$) | $f_v$ (%) |
| I | 90 | — | — | 90 | — | — | 8.64 | 400 | 193.95 | 94.73 |
| II | 40 | 2.16 | 0.64 | 46 | 2.16 | 0.52 | 8.64 | 400 | 193.95 | 93.26 |
| III | 20 | 2.16 | 1.48 | 46 | 2.16 | 0.52 | 8.64 | 400 | 193.95 | 88.24 |
| IV | 10 | 2.16 | 3.06 | 90 | 2.16 | 0.52 | 8.64 | 400 | 193.95 | 80.85 |

According to the dimensions in Table 1, the volume fraction $f_v$ of the hard phase for Designs I, II, III, and IV are 94.73%, 93.26%, 88.24% and 80.85%, respectively. $\lambda_c$ and $A_c$ are the wavelength and amplitude of the waves next to the connection locations, respectively. $\lambda_m$ and $A_m$ are the wavelength and amplitude of the waves at the midpoint between connection locations, respectively. l is again the straight-line distance between connection points for each hexagonal cell as shown in FIG. 1B. S is the area of each hexagonal cell. For each test specimen, the component consisted of an array of 5×5 unit cells ($L_1 \times L_2$=74.82 mm×64.80 mm), as shown in FIG. 2A, each side of which was flanked by a solid gripping region without any wavy structures or layers. Each test specimen was fabricated using a multi-material 3D printer (Objet Connex 260). The wavy interfacial layer was printed with TangoBlackPlus™ available from Stratasys having a modulus of about 4 MPa and the hard material phase are printed with VeroWhitePlus™ also available from Stratasus having a modulus of about 362,500 psi (2,700 MPa).

Figure 2B:
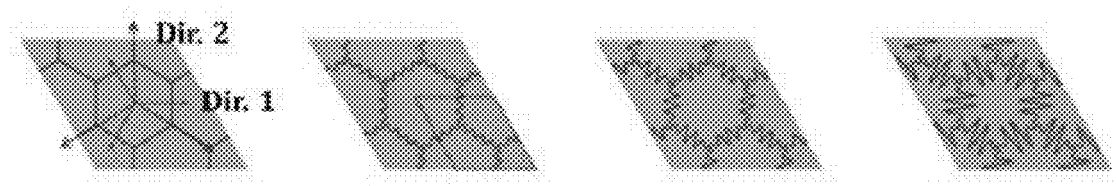
FIG. 2B illustrates the application of two loading directions on the identified Designs I, II, III and IV.
Figure 2C:
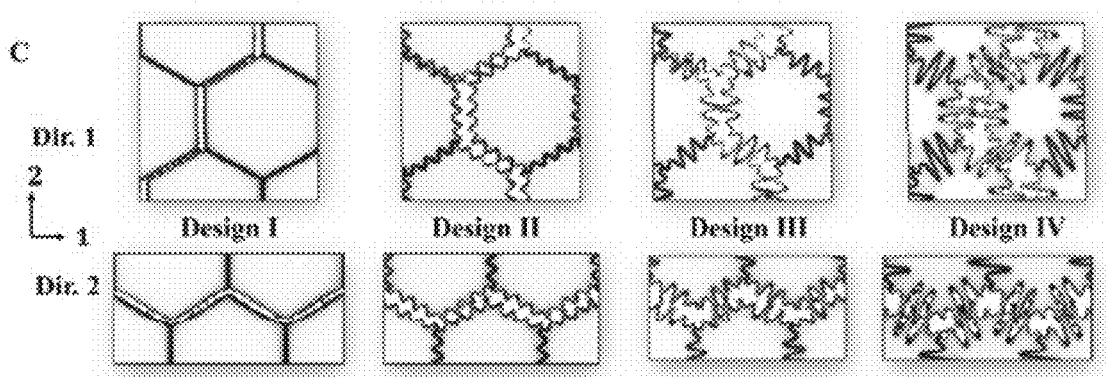
FIG. 2C provides higher magnification views of the interfacial crack formation due to the indicated loading directions.

Quasi-static mechanical testing experiments were performed to evaluate the mechanical behavior of the four designs under uniaxial tension along horizontal (Dir. 1) and vertical (Dir. 2) directions with the two loading directions representing the two major axes of symmetry of the hexagonal tessellation (FIG. 2B left). For reference, higher magnification views of the resting interfacial cracks of each design are shown in FIG. 2C. Under tensile loading in direction 1, cracks first propagate at the wavy interfaces along direction 2 and then along the diagonals; while under loading in direction 2, cracks propagate along the wavy interfaces in the diagonal sections.

Before mechanical testing, a white basecoat and black speckle patterns were sprayed on the wavy region of the specimens to obtain data for digital image correlation (DIC). Quasi-static (effective strain rate was controlled at $0.001 s^{-1}$) uniaxial tension experiments were performed for each specimen on a Zwick Z5.0 material testing machine (Zwick Roell, Germany). A 10 kN load cell was used, and during the experiments, a high-resolution camera (TAMRON, M23FM35) was used to track the displacement of the speckles. Images were recorded every 10s, and were post-processed via DIC software VIC 2D (2009). For repeatability, each set of the mechanical tests were performed in quadruplicate.

Figure 3A:
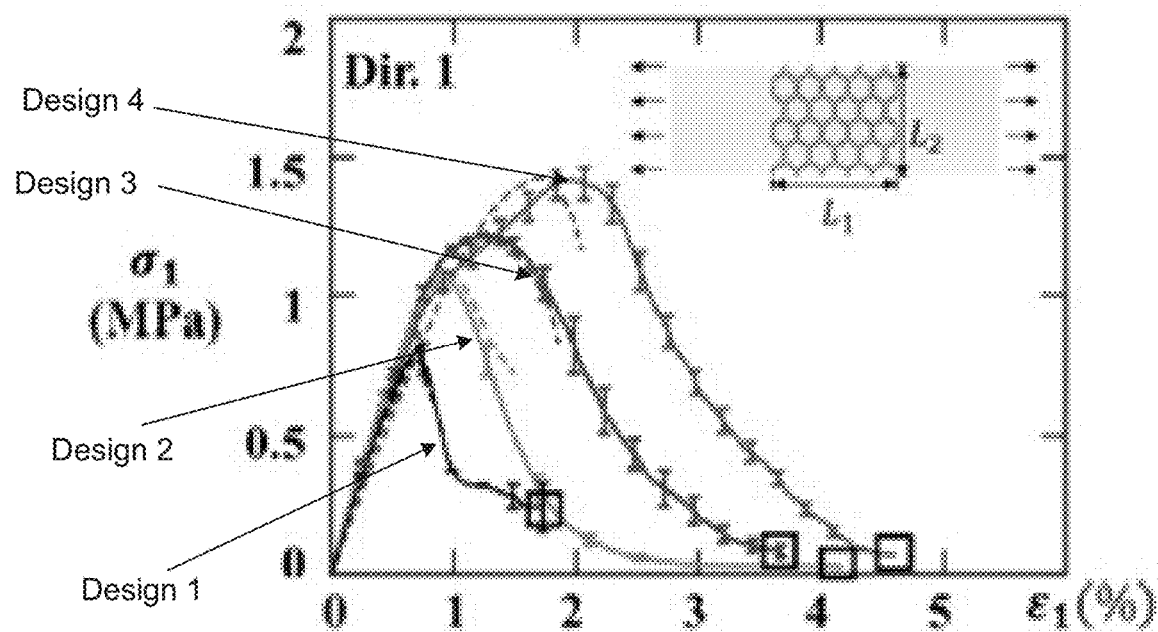
FIG. 3A provides a stress versus strain curve when loaded in the horizontal direction (Dir. 1) for the 3D printed specimens. Solid lines are average from experiments, dash lines are from FE simulations and square symbols are snapshots of final failure mode, i.e. the moment when damage occurs as shown in FIG. 2C.
Figure 3B:
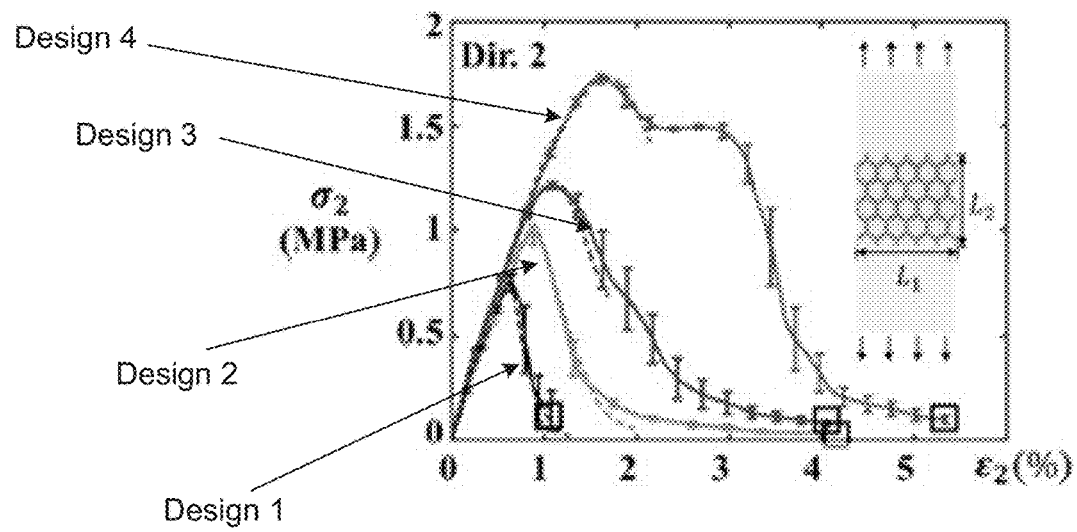
FIG. 3B provides a stress versus strain curve when loaded in the vertical direction (Dir. 2) for the 3D printed specimens. Solid lines are average from experiments, dash lines are from FE simulations and square symbols are snapshots of final failure mode, i.e. the moment when damage occurs as shown in FIG. 2C.
Figure 3C:
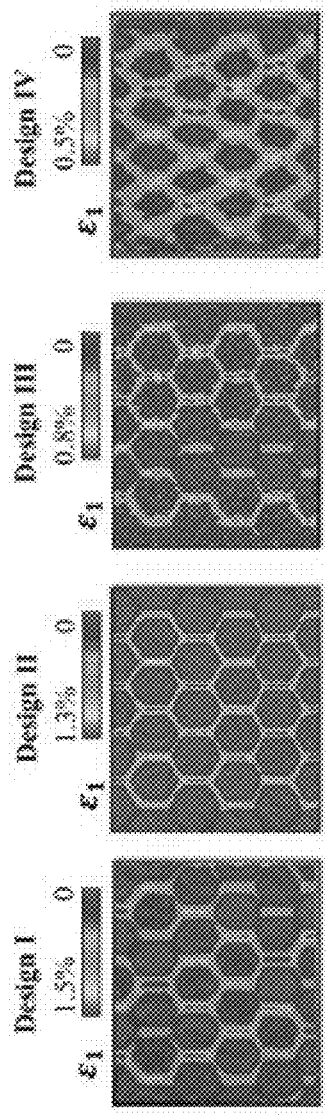
FIG. 3C provides a digital image correlation of the strain components in the loading direction for Designs I, II, III and IV under loading in Dir. 1.
Figure 3D:
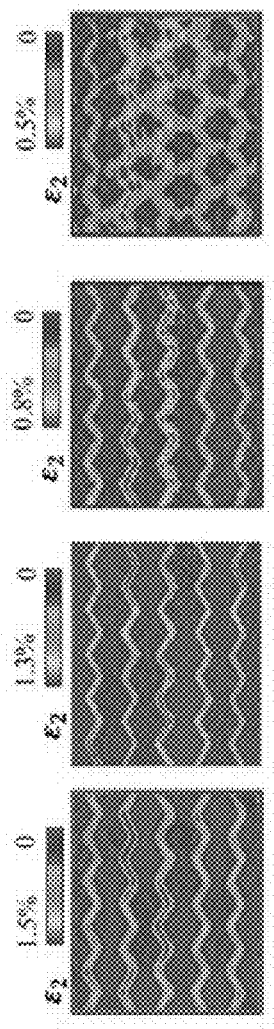
FIG. 3D provides a digital image correlation of the strain components in the loading direction for Designs I, II, III and Iv under loading in Dir. 2.

The effective experimental stress-strain curves of the four designs in directions 1 and 2 are shown in FIGS. 3A and 3B, respectively for the four designs shown in FIG. 2A. For statistics, the mechanical experiments were performed in quadruplicate for each of the eight cases. The solid lines represent the average curves for each case and the error bars represent +/− one standard deviation. The digital image correlation (DIC) contours of the strain components in the loading directions for Designs I, II, III, and IV at the overall tensile strain of 0.2% under loading in directions 1 and 2 are shown in FIGS. 3C and 3D, in which the strains are shown to localize in the wavy structures and in the hard phase surrounding the wavy structure. The values of $\varepsilon_1$ and $\varepsilon_2$ represent the percent elongation is direction 1 and 2, respectively. The highest strain occurs in the layers around the vertices of three neighboring cells. The zones of strain localization observed from the DIC contours under relatively small overall strain (FIGS. 3C and 3D) are consistent with the damage zones (resting interfacial cracks) at final failure shown in FIG. 2C.

Generally, for designs with a relatively large $\theta_m$ (i.e. less wavy structure), the array is relatively brittle (i.e. a relatively sharp drop in the stress-strain curve at break) but when $\theta_m$ decreases (i.e. when the wavy structure becomes more wavy), the array becomes increasingly ductile with an accompanying increase in strength.

Finite element (FE) models of the Representative Volume Elements (RVE) of the four designs were created in ABAQUS/V6.13 and 2D plane stress elements with reduced integration (CPS4R) were used. A continuum J2 plasticity model together with definition of damage initiation and evolution was used to model the elasticity, initial yielding, hardening, and damage initiation and evolution of both the hard and soft phases in each of the test specimens. The material parameters were determined from experiments. To simulate the experimental loading condition, a prescribed displacement was applied along either Dir. 1 or Dir. 2. A mesh sensitivity study was performed to balance accuracy and computational cost, with a highly refined mesh used for the wavy interfacial layer. To further quantify the mechanical properties of the 3D printed composite plates, FE and experimental results are compared in FIGS. 3A, 3B (dash lines are FE results), and FIGS. 4A, 4B, and 4C.

Figures 4A, 4B:
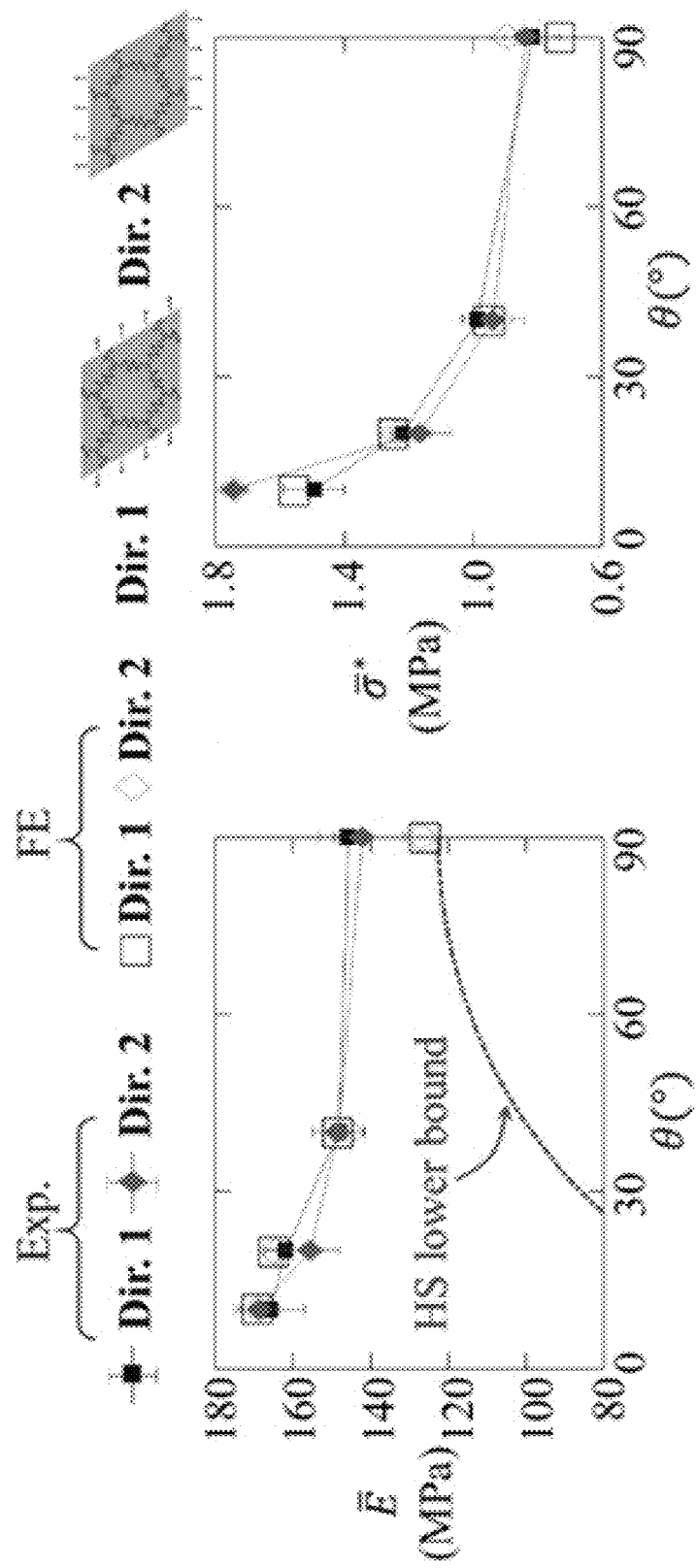
FIG. 4A provides experimental and FE results for the overall stiffness $\overline{E}$ at the overall strain of 0.2% in both directions.
FIG. 4B provides experimental and FE results for overall strength $\overline{\sigma}^*$ (stress at the peak of effective stress-strain curve) at the overall strain of 0.2% in both directions.
Figure 4D:
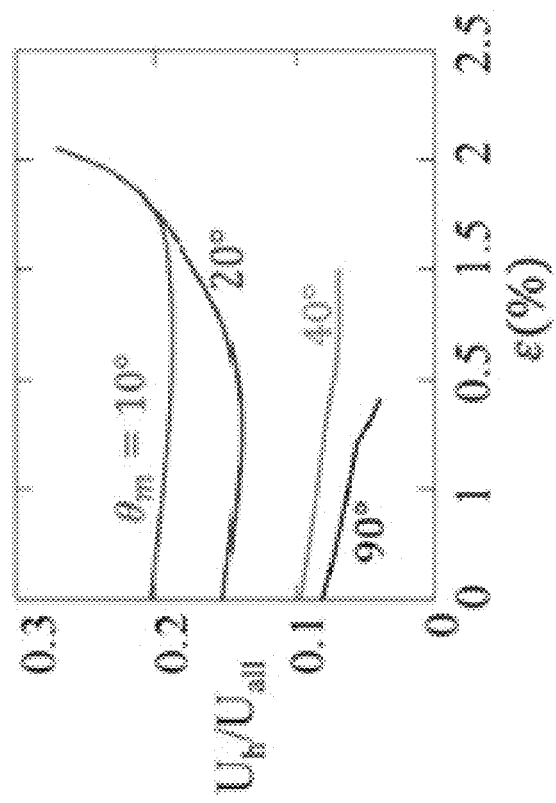
FIG. 4D provides a plot of the strain energy ratio $U_h/U_{all}$ as a function of overall strain.
Figure 4C:
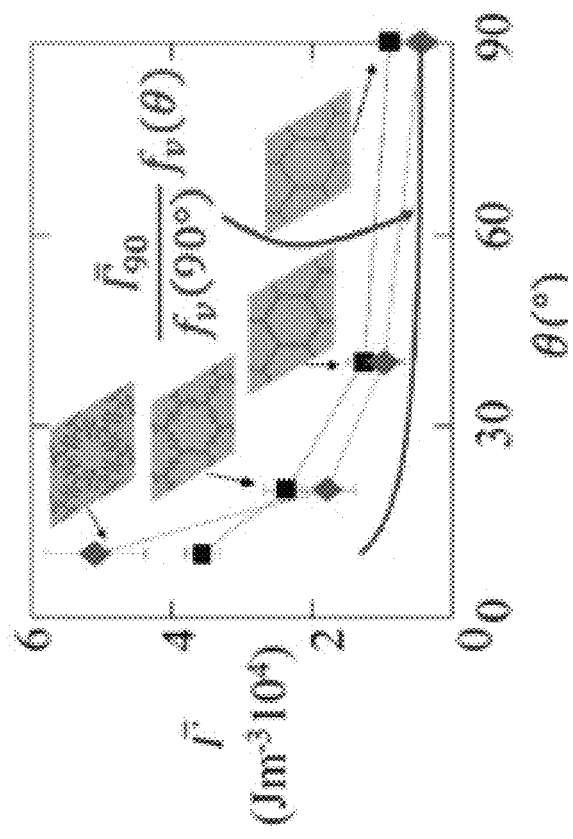
FIG. 4C provides experimental and FE results for fracture toughness $\overline{\Gamma}$ at the overall strain of 0.2% in both directions.

The FE and experimental results for the overall stiffness $\overline{E}$, overall strength $\overline{\sigma}^*$ (stress at the peak of effective stress-strain curve), and fracture toughness $\overline{\Gamma}$ at the overall strain of 0.2% in both directions for all designs are plotted and compared in FIGS. 4A, 4B and 4C, respectively. Generally, the FE predictions are consistent with the experimental results, and the effective stiffness, strength, and fracture toughness in directions 1 and 2 agree well. Interestingly, when $\theta_m$ decreases, both overall strength $\overline{\sigma}^*$ and the fracture toughness $\overline{\Gamma}$ (the area underneath the stress-strain curve) increase dramatically.

As for the overall stiffness, FIG. 4A shows that for the specimens with flat interfaces ($\theta_m$=90° the overall stiffness is close to the Hashin-Shtrikman lower bound. The Hashin-Shtrikman model predicts the effective stiffness of composites, which is dominated by the volume fraction of the hard phase. Usually, this lower bound is considered as the tightest lower bound for a two-phase composite. When the interface becomes increasingly wavy (i.e. $\theta_m$ decrease), the volume fraction of the hard phase decreases, and the line of the Hashin-Shtrikman lower bound decreases. However, remarkably, both the experimental and FE results show the overall stiffness increases, instead. These results demonstrate that in composites with a relatively hard phase and a relative soft phase of wavy structure, the overall stiffness can be increased beyond the rule of mixtures, and for these composite structures, the interfacial waviness (rather than simply the volume fraction of the interfacial phase) plays a critical role in amplifying the overall stiffness.

Figure 4E:
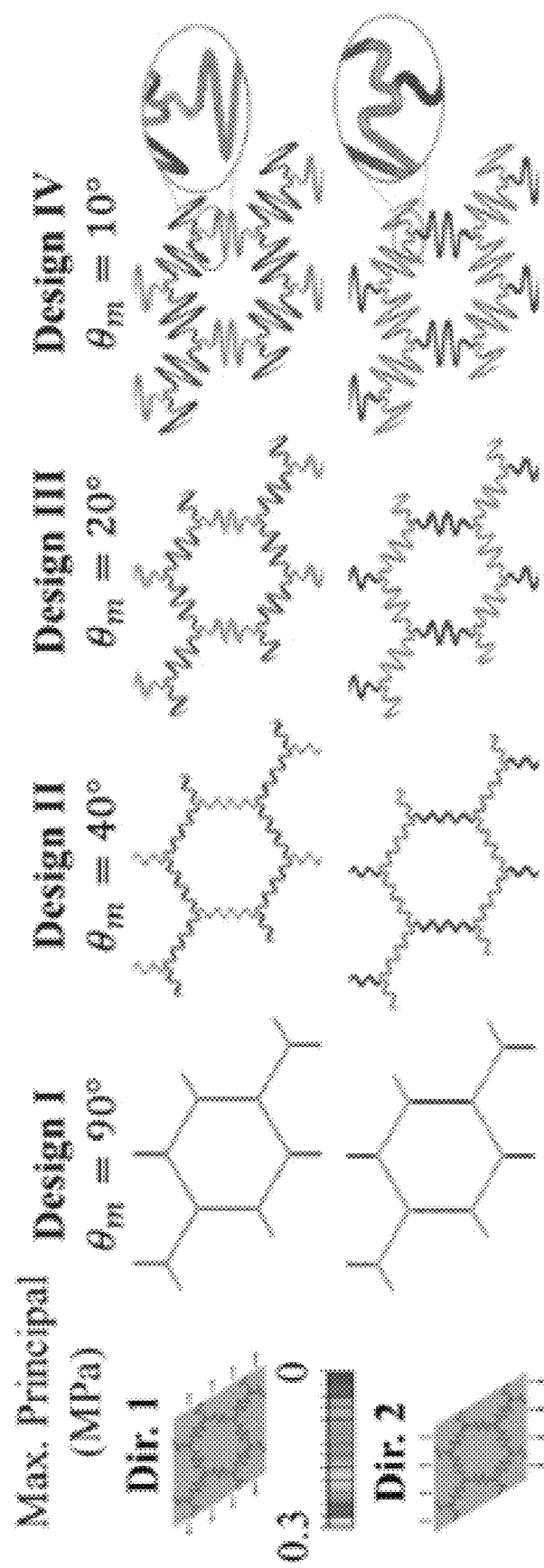
FIG. 4E provides the FE contours of the maximum principal stress in the identified designs at a global strain of 0.2%.

To better understand the reason for the dramatic increase in fracture toughness with increased amount of wavy structure, in FIG. 4C, one compares the fracture toughness from the mechanical testing experiments with a prediction based on the rule of mixtures. $\bar{\Gamma}=\Gamma_{90}SI$, assuming the hard phase is rigid, $\Gamma_{90}$ represents the fracture toughness of Design I with $\theta_m=90°$, and SI represents the suture complexity index. From this comparison, it is observed that the experimental toughness measurements (FIG. 4C) are well above that of the prediction based on $\Gamma_{90}$ and SI especially when the wavy structure becomes increasingly wavy. From the FE simulations, the strain energy in the hard phase $U_h$ and total strain energy $U_{all}$ was determined followed by a plot of the strain energy ratio $U_h/U_{all}$ as a function of overall strain (FIG. 4D). When $\theta_m$ decreases, i.e. the interface becomes increasingly wavy and the fracture toughness dramatically increases, as shown in FIG. 4C. This dramatic increase in fracture toughness occurs because, as the wavy structures becomes wavier, the hard phase becomes more effective at storing energy, while, the strain energy absorbed by the wavy segments decreases, leading to a subsequent increase in overall strength. From the FE contours of the maximum principal stress shown in FIG. 4E, it can be seen that for the case with a flat interfacial layer, extreme stresses are localized in some of the interfacial layers while other regions exhibit close-to zero stress. In contrast, when the wavy segments become wavier, no interfacial regions exhibit close-to-zero stress and stress localization becomes much less of a concern. As a result, the stresses are more uniformly distributed along the wavy segments, instead of localizing in specific regions, resulting in an increase in the overall strength of the composite.

To systematically explore the influence of the stiffness ratio between the hard and soft phases on the mechanical properties of these tiled composites, a parametric study was performed via FE simulations in loading direction 1. For all FE models, the Young's modulus and the Poisson's ratio of the relatively soft interfacial layer was the same ($E_i$=4.1 MPa, $v_i$=0.4), while the Young's modulus of the hard phase varied from 20, 200, 2000, to 20,000 MPa. Thus, the stiffness ratio preferably varied as $$\frac{E_h}{E_i} \approx 5, 50, 500, \text{ and } 5000,$$

respectively. Accordingly, the stiffness ratio here may range from a value of greater than 1.0 to 10,000, or in the range of greater than 1 to 5,000. The Poisson's ratio of the hard phase was kept the same $v_h$=0.3 for all simulations. Both the hard and soft phases were modeled as an elasto-plastic material with damage initiation and evolutions defined by a damage mechanics model.

Figure 5B:
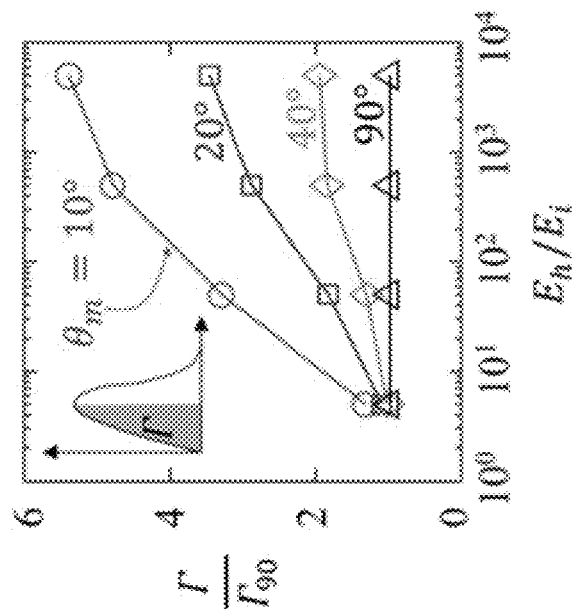
FIG. 5B shows a plot of fracture toughness $\Gamma/\Gamma_{90}$ (where $\Gamma_{90}$ represents the fracture toughness for damage initiation of the specimen with $\theta_m$=90°) versus stiffness ratio.
Figure 5A:
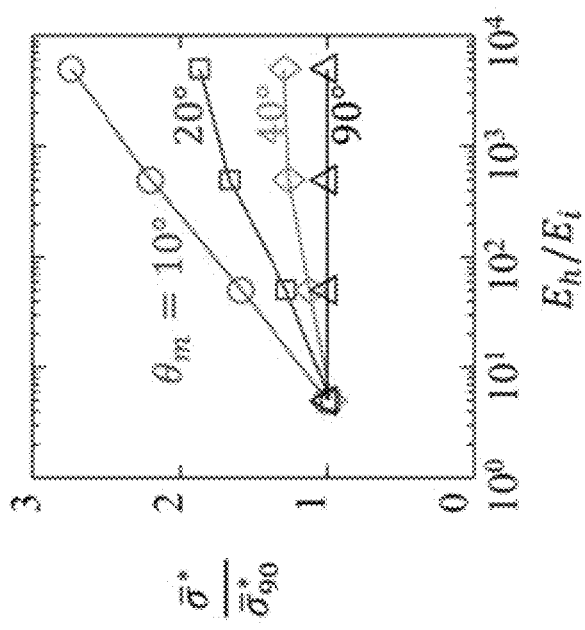
FIG. 5A shows a plot of non-dimensionalized strength $\overline{\sigma}^*/\overline{\sigma}^*_{90}$ (where $\overline{\sigma}^*_{90}$ represents the overall strength of the specimen with $\theta_m$=90°) versus stiffness ratio.

From the parametric study, and taking the design with flat interfacial layer (Design I) as the reference case, the non-dimensionalized strength $\bar{\sigma}^*/\bar{\sigma}^*_{90}$ (where $\bar{\sigma}^*_{90}$ represents the overall strength of the specimen with $\theta_m=90°$) and fracture toughness $\Gamma/\Gamma_{90}$ (where $\Gamma_{90}$ represents the fracture toughness for damage initiation of the specimen with $\theta_m=90°$) for damage initiation are plotted in FIGS. 5A and 5B, respectively. The strength $\bar{\sigma}^*$ is defined as the peak stress of the stress-strain curves, and the toughness for damage initiation is defined as the area under the stress-strain curves before the peaks (shaded inset, FIG. 5B). FIGS. 5A and 5B show that both $\bar{\sigma}^*/\bar{\sigma}^*_{90}$ and $\Gamma/\Gamma_{90}$ increase monotonically with the stiffness ratio $E_h/E_i$, and when the waviness increases (i.e. when $\theta_m$ decreases), both $\bar{\sigma}^*/\bar{\sigma}^*_{90}$ and $\Gamma/\Gamma_{90}$ increase dramatically. These results demonstrate that when $E_h/E_i$ increases, the contribution of waviness to the mechanical performance of the composite is amplified.

Figure 5C:
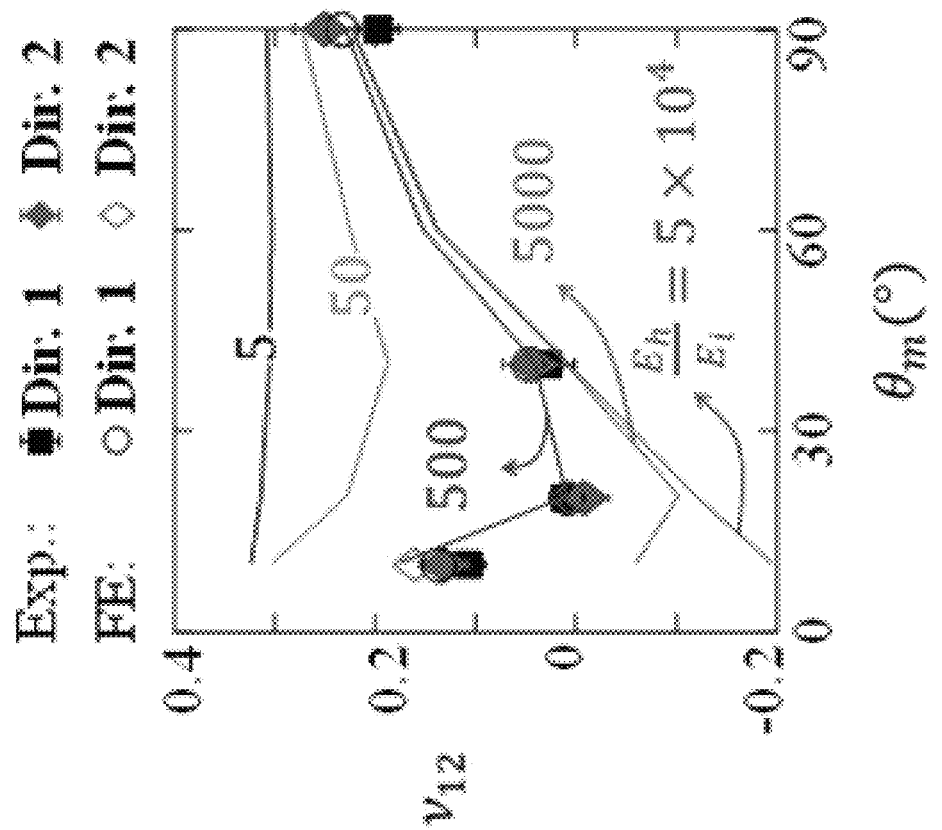
FIG. 5C provides a plot of the experimental and FE analysis of the overall Poisson's ratio $v_{12}$ versus $\theta_m$ for the indicated varying stiffness ratios.

The Poisson's ratios of the four 3D-printed designs were measured via DIC from the mechanical testing experiments and were compared to those obtained from the FE simulations (FIG. 5C). It can be seen that the Poisson's ratio is sensitive to the waviness $\theta_m$ and the stiffness ratio $E_h/E_i$. Generally, when $E_h/E_i$ increases, the Poisson's ratio decreases and becomes increasingly sensitive to $E_h/E_i$. When $\theta_m$ decreases, the Poisson's ratio first decreases and then increases. When $E_h/E_j$ increases, the critical waviness $\theta_m$ corresponding to its minimum value decreases. These results compare very well to those obtained from the mechanical tests on the 3D-printed specimens. For the cases with relatively large stiffness ratio ($E_h/E_i$=500 and 5000), a minimum in the value of Poisson's ratio is obtained at about $\theta_m$=20°. Poisson's ratio herein is understood as the proportional decrease in lateral measurement to the proportional increase in the network structure herein when it is stretched.

Figure 5D:
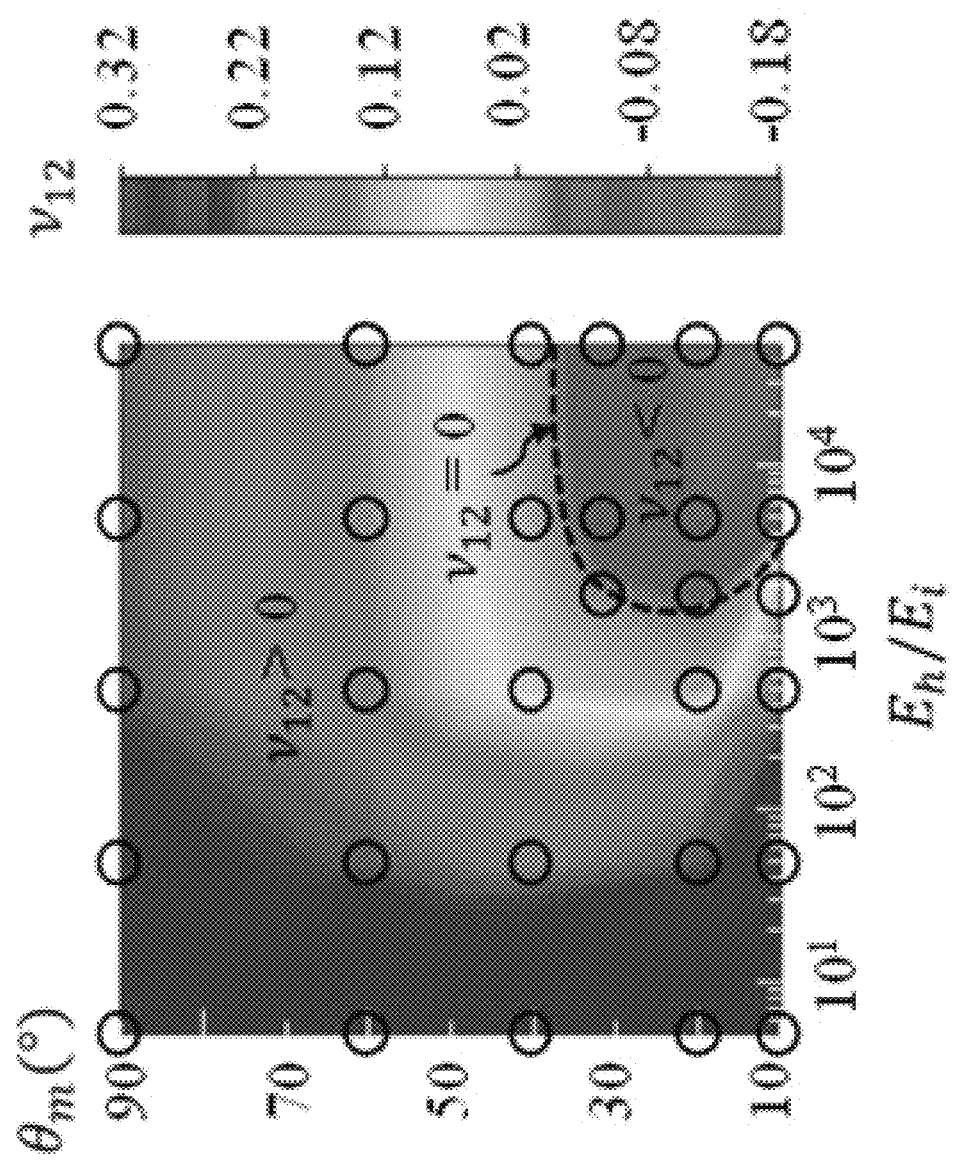
FIG. 5D provides a plot of the overall Poisson's ratio $v_{12}$ as a function of stiffness ratio and the waviness parameter $\theta_m$ (circles represent the FE results and the dashed line bounds the design space of auxeticity, i.e. negative Poisson's ratio).

To further explore the parametric space for achieving a negative Poisson's ratio, the numerical contour of the Poisson's ratio was plotted in FIG. 5D via the interpolation of the FE results (circles in FIG. 5D). The dashed line in FIG. 5D bounds a region of negative Poisson's ratio in the design space, which is well within the bounds explored in the 3D printed test specimens. From these combined studies (FEA and direct mechanical testing), it was determined that the network structures become auxetic (i.e. with negative Poisson's ratio) when the stiffness ratio $$\frac{E_h}{E_i}$$

preferably increases beyond ~$5\times10^3$–$5\times10^4$, and when the waviness parameter $\theta_m$ preferably decreases beyond ~10°–20°. More generally, the network structures preferably have a stiffness ratio $$\frac{E_h}{E_i}$$

herein of $\geq 1\times10^3$ with the value of $\theta_m$ at $\geq 5°$. Even more preferably, the network structures have a stiffness ratio $$\frac{E_h}{E_i}$$

herein of $\geq 1\times10^3$ to $10^5$ with the value of $\theta_m$ at $\geq 5°$ to $40°$ to promote auxeticity. This auxeticity is, e.g., beneficial in delaying damage initiation and retarding crack propagation, and therefore, further increasing the strength and fracture toughness.

What is claimed is:

1. A network structure comprising:
three wavy segments that extend in three directions from a first connection location wherein said wavy segments have a Young's modulus value Ei and said wavy segments are dispersed in a second phase of material having a Young's modulus $E_h$, where Eh>Ei;
wherein said wavy structure is positioned between said first and a second connection location and at about a midpoint between said connection locations said wavy structure changes direction and defines an angle $2\theta_m$ wherein the value of $\theta_m$ is greater than or equal to 5° and the value of $E_h$/Ei is greater than or equal to $1 \times 10^3$.

2. The network structure of claim 1 wherein the value of $\theta_m$ is greater than or equal to 5° up to 40° and the value of $E_h$/Ei is greater than or equal to $1 \times 10^3$ up to $10^5$.

3. The network structure of claim 2 wherein said network structure indicates a negative Poisson's ratio.

4. The network structure of claim 1 wherein one or a plurality of polygonal geometric shapes can be superimposed on said wavy segments.

5. The network structure of claim 1 wherein said network structure indicates a negative Poisson's ratio.

* * * * *

UNITED STATES PATENT AND TRADEMARK OFFICE
CERTIFICATE OF CORRECTION

| | |
|---|---|
| PATENT NO. | : 11,383,486 B2 |
| APPLICATION NO. | : 16/531858 |
| DATED | : July 12, 2022 |
| INVENTOR(S) | : Yaning Li |

It is certified that error appears in the above-identified patent and that said Letters Patent is hereby corrected as shown below:

In the Specification

In Column 1, Line 3, before "TECHNICAL FIELD" insert:
--STATEMENT REGARDING FEDERALLY SPONSORED RESEARCH OR DEVELOPMENT
This invention was made with government support under 1362893 awarded by the National Science Foundation. The government has certain rights in the invention.--

Signed and Sealed this
Twelfth Day of December, 2023

Katherine Kelly Vidal
*Director of the United States Patent and Trademark Office*